March 26, 1935.   E. W. B. GILL   1,995,848

THERMIONIC VALVE

Filed April 14, 1932.

INVENTOR
ERNEST W. B. GILL
BY
ATTORNEY

Patented Mar. 26, 1935

1,995,848

UNITED STATES PATENT OFFICE 1,995,848

THERMIONIC VALVE

Ernest Walter Brudenell Gill, Merton College, Oxford, England, assignor to Radio Corporation of America, a corporation of Delaware Application April 14, 1932, Serial No. 605,264
In Great Britain April 16, 1931

4 Claims. (Cl. 250—27.5)

This invention relates to thermionic devices and has for its object to provide a tube structure suitable for use at very high frequencies wherein the danger of what may be termed "electrodeless" discharge occurring within the envelope is reduced or eliminated.

According to this invention a thermionic device is provided with one or more insulating internal partitions projecting wholly or in part across the alternating fields set up in the tube when in use.

The nature of the invention and its modus operandi may be explained with reference to tests which have been made pertaining to the occurrence of electrode-less discharge in gases at various pressures.

The tests to be described were conducted by means of apparatus consisting of a glass tube 3 cm. in diameter located between two parallel plates between which alternating potentials were applied, the tube being closed at one end and connected at the other to a suitable device for varying the pressure of the gas within the said tube. The gas within said tube was air and a series of observations were taken at various pressures and frequencies of applied potential in order to ascertain the minimum applied potentials required under various conditions to cause a visible discharge to occur within the tube i. e., to cause the tube to light up.

Figure 1:
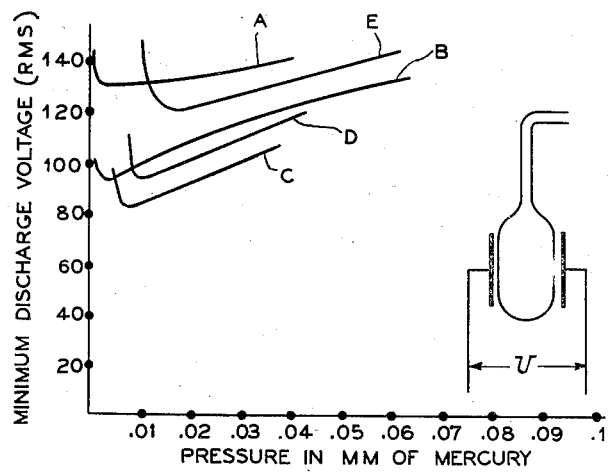
Figure 2:
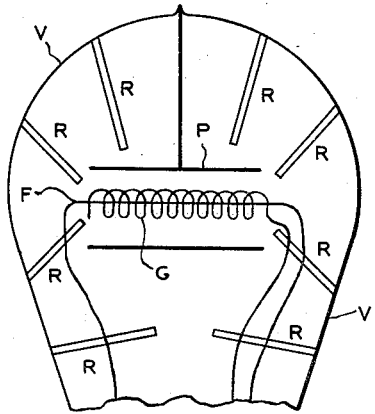

Fig. 1 of the drawing in which the ordinates are root mean square values of minimum voltages for discharge and the abscissae are gas pressures expressed in terms of millimetres of mercury shows graphically the results of these tests, and Fig. 2 shows, in schematic section, an improved structural arrangement in accordance with the present invention.

Referring to Fig. 1 curve A is the curve connecting the observations made when the frequency of the applied potential ($v$) was that corresponding to a wave length of 5.5 metres; curve B was obtained with a frequency corresponding to a wave length of 6.5 metres; curve C at 8.4 metres; curve D at 10.5 metres; and curve E at 12.5 metres.

It will be observed from these results (1) that as the wave length is reduced from 12.5 to 8.4 metres, the general level of the curves falls, and that at or about 8.4 metres there is a transition and the levels of the curves rise again, and (2) that as the wave length diminishes, the pressure corresponding to the minimum potential at which discharge occurs decreases and that in every case the curves all rise speedily to the left of their minima. In other words, at pressures a little below the minima a very high voltage is required for a discharge to occur. It will also be noted that discharges may occur easily at very low pressures if the frequency is very high. This may be seen from the following table in which the wave lengths in metres of the applied potentials are given in the first column:—

5.5 metres 120 volts produces a discharge at .002 mm
6.5 metres 94 volts produces a discharge at .003 mm
7.5 metres 85 volts produces a discharge at .006 mm
8.4 metres 82 volts produces a discharge at .007 mm
10.5 metres 95 volts produces a discharge at .01 mm
12.5 metres 121 volts produces a discharge at .02 mm A gas pressure of 1/100 mm. of mercury is, of course, a very low pressure. For wave lengths above 12 metres the pressure for an easy discharge increased very quickly; for 20 metres the pressure is $\frac{1}{10}$ mm. and for 50 metres it is $\frac{1}{10}$ mm.

All the foregoing results were obtained with a tube of the dimensions stated, i. e., of 3 cm. diameter and with the gas within the said tube subjected to an alternating field only. While the theory may be somewhat conjectural, it is found in practice that the larger the tube the lower the pressures at which these discharges occur (or alternatively, at pressures of the order above mentioned, the discharges will be produced at longer wave lengths) the said discharges occurring only at comparatively high pressures in a tube of small diameter. It also appears that the starting of a discharge is rendered slightly more difficult by the superimposition of a static field upon the alternating field.

From the foregoing, it would appear that the liability of electrode-less or induced glow discharge occurring in a tube is a function of the length of the mean free path of electrons in circumstances in which said electrons are comparatively free from the influence of static fields, and that by subjecting the electrons to the influence of static fields, and more especially by reducing the length of the mean free path, the liability to discharge can be greatly reduced.

In short wave radio signalling systems, it is becoming increasingly desirable to manufacture large size thermionic devices for use at very high frequencies, and in carrying out the present invention these devices are so constructed that the length of the uninterrupted mean free path for electrons is greatly reduced.

In Fig. 2 which illustrates diagrammatically a tube according to the invention, the electrodes are represented in ordinary conventional form of an electrode assembly, P being the plate, G the grid, and F the filament. The envelope of the tube is indicated at V and, as will be seen, glass partitions R, formed upon or otherwise carried by the envelope, and projecting radially inward toward the electrodes and spaced about the envelope to form pockets about the electrodes, are provided. These partitions serve to limit the length of the mean free path for any electron moving in an alternating field set up when the device is in use, since any electron so moving will collide with one or other of the partitions. When the tube is in use, the normal anode-cathode direct current voltage of course gives rise to a static field. In Fig. 2, the tube illustrated is of normal construction as regards the electrode arrangement, but if desired, in carrying out the present invention the shape, size, and location of the electrodes may be so chosen that the static field produced by the normally applied anode potential extends as far over the tube as possible so that the influence of this field upon the electrons is as great as conveniently practicable.

I claim.

1. A device for use in the translation of high frequency currents, said device comprising an envelope containing an electron emitting cathode, a grid, an anode and an inert gas, a plurality of insulating baffle plates spaced about the envelope and secured thereto, said plates extending inwardly from the envelope into the electrostatic fields surrounding the electrodes and serving to restrict the mean free path of the electrons whereby the susceptibility of the tube to glow by electrode-less discharge is reduced.

2. A device for use in the translation of high frequency currents, said device comprising an envelope containing an inert gas, an electrode system mounted within and spaced from said envelope, a plurality of insulating plates arranged within the envelope and secured thereto, said plates extending toward and terminating in the region immediately adjacent the electrode system whereby the electrostatic fields surrounding the electrode system are intercepted and the susceptibility of the tube to glow by electrode-less discharge is reduced.

3. A high frequency current translating device comprising an envelope containing an inert gas at low pressure, an electrode assembly comprising cooperating electrodes mounted in and spaced away from the walls of said envelope, and insulating baffles disposed in said envelope and around said electrode assembly to intercept the circulation of electrons about said electrode assembly.

4. A high frequency current translating device comprising an envelope containing an inert gas at low pressure, an electrode assembly comprising cooperating electrodes mounted in and spaced away from the walls of said envelope, and insulating projections extending radially inward from the walls of said envelope toward said electrodes and spaced away from one another to form around said electrode assembly a plurality of pockets open to the electrode assembly.

ERNEST WALTER BRUDENELL GILL.